(12) United States Patent
Martin (10) Patent No.: US 8,505,473 B1
(45) Date of Patent: Aug. 13, 2013

(54) PAIRED SINGLE DISC OPENER UNIT

(76) Inventor: Howard D. Martin, Elkton, KY (US)

( * ) Notice: Subject to any disclaimer, the term of this patent is extended or adjusted under 35 U.S.C. 154(b) by 174 days.

(21) Appl. No.: 12/687,591

(22) Filed: Jan. 14, 2010

Related U.S. Application Data (63) Continuation-in-part of application No. 12/687,591, filed on Aug. 15, 2008, now Pat. No. 7,669,536.

(51) Int. Cl.
*A01B 5/00* (2006.01)
*A01B 7/00* (2006.01)
*A01B 21/00* (2006.01)
*A01C 5/00* (2006.01)
*A01C 7/18* (2006.01)

(52) U.S. Cl.
USPC .............. 111/52; 111/164; 111/926; 172/574

(58) Field of Classification Search
USPC ................. 172/462, 484, 488, 500, 536, 764, 172/394, 576, 738, 387, 727, 574, 575, 603, 172/172/392, 388; 111/52, 163, 164, 926
See application file for complete search history.

(56) References Cited

U.S. PATENT DOCUMENTS

| | | | | |
|---|---|---|---|---|
| 4,275,670 A | * | 6/1981 | Dreyer | 111/195 |
| 4,407,207 A | * | 10/1983 | Dreyer | 111/136 |
| 7,669,536 B2 | * | 3/2010 | Martin | 111/52 |

\* cited by examiner

*Primary Examiner* — Christopher J. Novosad
(74) *Attorney, Agent, or Firm* — Hamilton IP Law, PC; Jay R. Hamilton; Charles A. Damschen (57) ABSTRACT

An opener unit having a pair of single disc openers mounted upon a parallel linkage which may be mounted onto a tool bar or drawbar is disclosed and claimed. The pair of single opener discs may be used for controlled creation of a pair of furrows to which seed, fertilizer or other soil amendments may be delivered. The opener unit may be mounted in combination with a row clearing or cleaning unit. The opener unit may also be mounted in combination with an auxiliary depth tire or a ski, and or a furrow closing device such as a wheel, a chain or a strap.

4 Claims, 12 Drawing Sheets

PAIRED SINGLE DISC OPENER UNIT

RELATED APPLICATIONS

Applicant states that this utility patent application claims priority from and is a continuation of U.S. patent application Ser. No. 12/192,616, filed Aug. 15, 2008, now U.S. Pat. No. 7,669,536, which is a continuation of U.S. patent application Ser. No. 12/038,812, filed Feb. 28, 2008, now U.S. Pat. No. 7,644,670, which is incorporated by reference herein, and which claimed priority under 35 U.S.C. §119(e) from provisional U.S. Patent Application Ser. No. 60/903,910 filed on Feb. 28, 2007 which is also incorporated by reference herein.

FIELD OF THE INVENTION

The methods described herein are generally applicable to the field of agricultural equipment. The embodiments shown and described herein are more particularly for improved furrow opening for delivery of seed or fertilizer. Although in no way limiting, the present disclosure is particularly suited for minimum or no-till conditions.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

BACKGROUND

The following patents illustrate prior art which may be relevant to the invention disclosed and claimed herein, but which fail to teach the improvement disclosed and claimed herein:

1. U.S. Pat. No. 4,275,670 issued to Dreyer for "Seed Drill Mounting Arrangement";
2. U.S. Pat. No. 4,407,207 issued to Dreyer for "Drill Having Disk Furrow Openers";
3. U.S. Pat. No. 5,802,995 issued to Baugher et al. for "Planting Unit";
4. U.S. Pat. No. 6,308,645 issued to Newkirk et al. for "Seeding Machine with Bulk Seed Supply Container and Independent, Opener-Mounted Metering Devices";
5. U.S. Pat. No. 4,422,392 issued to Dreyer et al. for "Seed Drill with Disk-Type Furrow Openers";
6. U.S. Pat. No. 4,117,788 issued to Whitehead for "Seed Drill Including Discs Driven by Ground Wheel Drive";
7. U.S. Pat. No. 4,366,760 issued to Dreyer for "Seed Drill"; and,
8. Great Britain Patent #1,218,785 issued to Moore et al. for "Improved Method and Means for Agricultural Seeding."

Furthermore, other patents of interest may include U.S. Pat. No. 2,605,017; U.S. Pat. No. 2,552,810 and U.S. Pat. No. 2,406,702

SUMMARY OF INVENTION

Applicant discloses and claims herein a Paired Single Disc Opener Unit which, without limitations, has particular application as an improved no-till or minimum tillage sowing machine, planting apparatus and or planting row unit. As disclosed, the design allows for a pair of single disc furrow openers to be mounted to a common parallel linkage, wherein the pair of single disc openers has a plane of symmetry parallel to the direction of travel of the sowing machine and wherein the parallel linkage experiences virtually no lateral load because the lateral load created by one disc of the pair offsets the lateral load created by the corresponding disc of the pair.

DETAILED DESCRIPTION

DETAILED DESCRIPTION - LISTING OF ELEMENTS

| Element Description | Element Number |
|---|---|
| Upper Parallel Link | 1 |
| Lower Parallel Link | 2 |
| Mounting Plate | 3 |
| Receiver Tube | 4 |
| Adjustable Gauge (depth) Wheel Hub Support Tube | 5 |
| Horizontal Support | 6 |
| Horizontal Support Center Plate | 7 |
| Left Hub Support | 8 |
| Right Hub Support | 9 |
| Left Opener Disc | 10 |
| Right Opener Disc | 11 |
| Left Opener Disc Seed Delivery Tube | 12 |
| Right Opener Disc Seed Delivery Tube | 13 |
| Left Opener Disc Beveled Edge | 14 |
| Right Opener Disc Beveled Edge | 15 |
| Left Furrow Control Strap | 16 |
| Right Furrow Control Strap | 17 |
| Left Furrow Control Strap Mount | 18 |
| Right Furrow Control Strap Mount | 19 |
| Left Opener Disc Hub | 20 |
| Gauge (depth) Wheel | 21 |
| Gauge (depth) Wheel Hub Support | 22 |
| Gauge (depth) Wheel Axle | 23 |
| Material Delivery Tube Support | 24 |
| Right Opener Disc Hub | 25 |

DETAILED DESCRIPTION - LISTING OF ELEMENTS

| Element Description | Element Number |
|---|---|
| Opener Unit | 26 |
| Pin | 27 |
| Support Tube Pin Hole | 28 |
| Left Disc Axle | 29 |
| Right Disc Axle | 30 |
| Tool Bar | 31 |
| Linkage Spring | 32 |
| Row Cleaning Wheel | 33 |
| Closing Wheel | 34 |
| Left Row Cleaner Arm | 35 |
| Right Row Cleaner Arm | 36 |
| Closing Wheel Depth Lever | 37 |
| J-bolts | 38 |
| Closing Wheel Mounting Arm | 39 |
| Front Attachment Protrusion | 40 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION OF INVENTION

Figure 1:
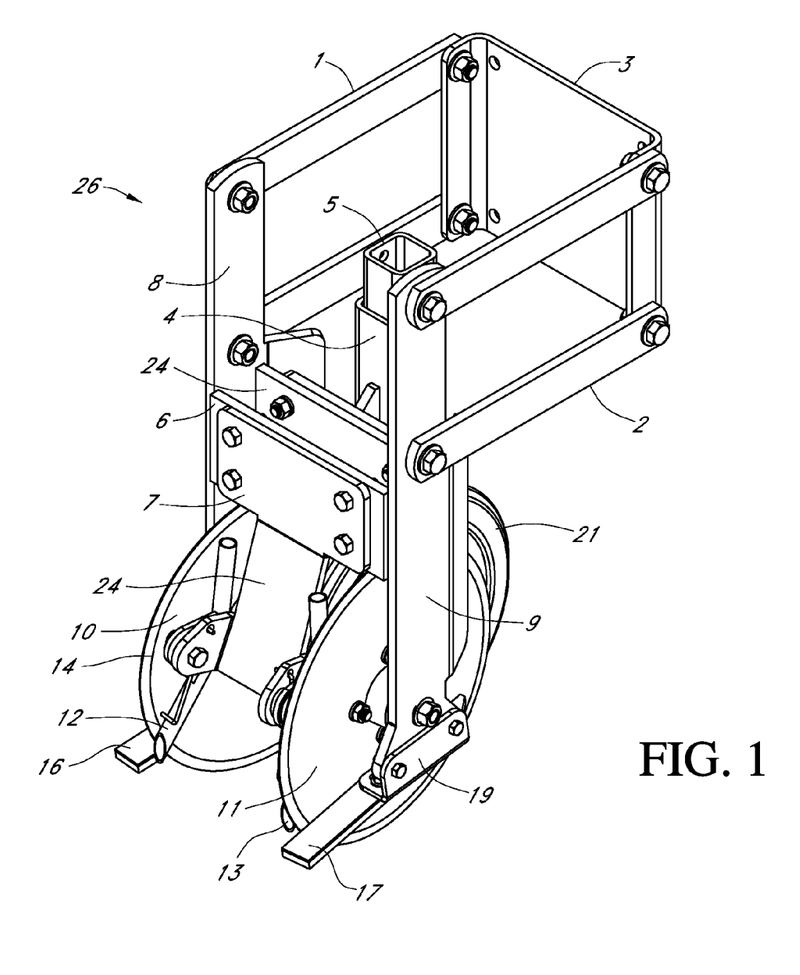
FIG. 1 provides a side perspective illustrating one embodiment of applicant's opener unit.
Figure 2:
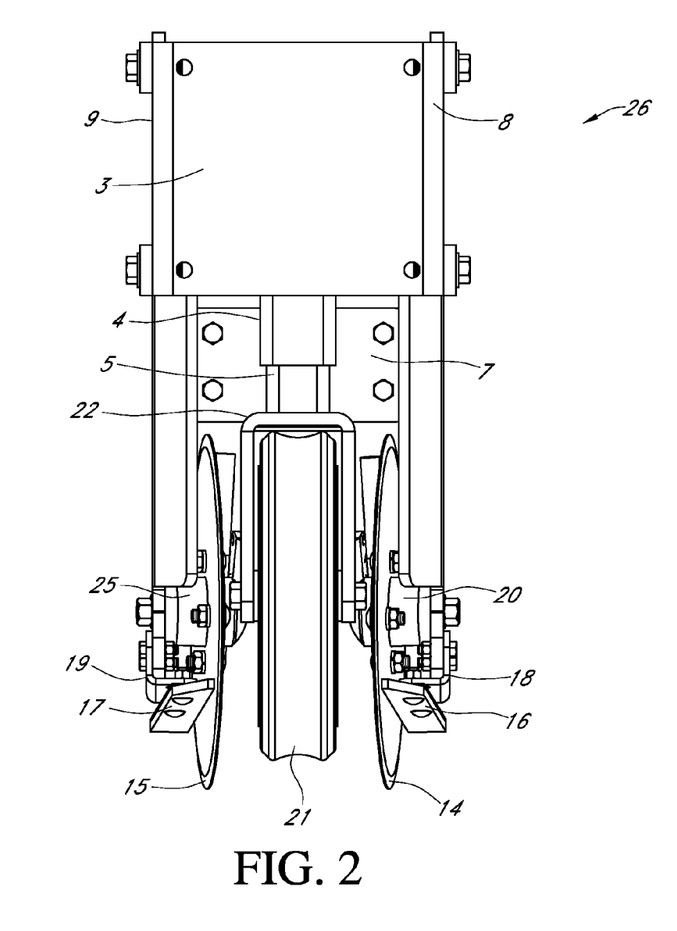
FIG. 2 provides a front view illustrating one embodiment of applicant's opener unit.
Figure 3:
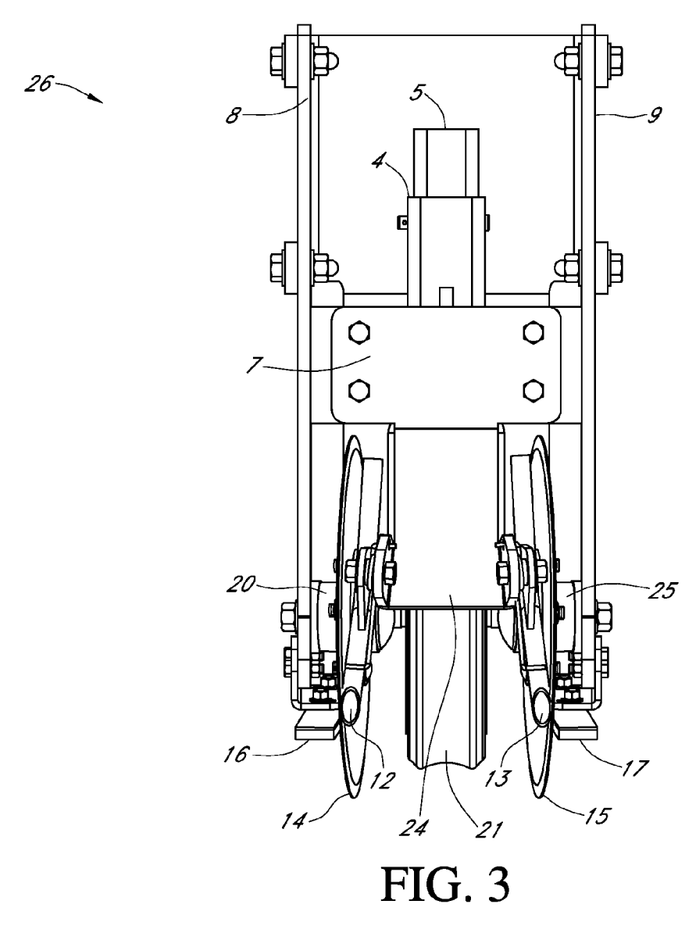
FIG. 3 provides a rear view illustrating one embodiment of applicant's opener unit.
Figure 6:
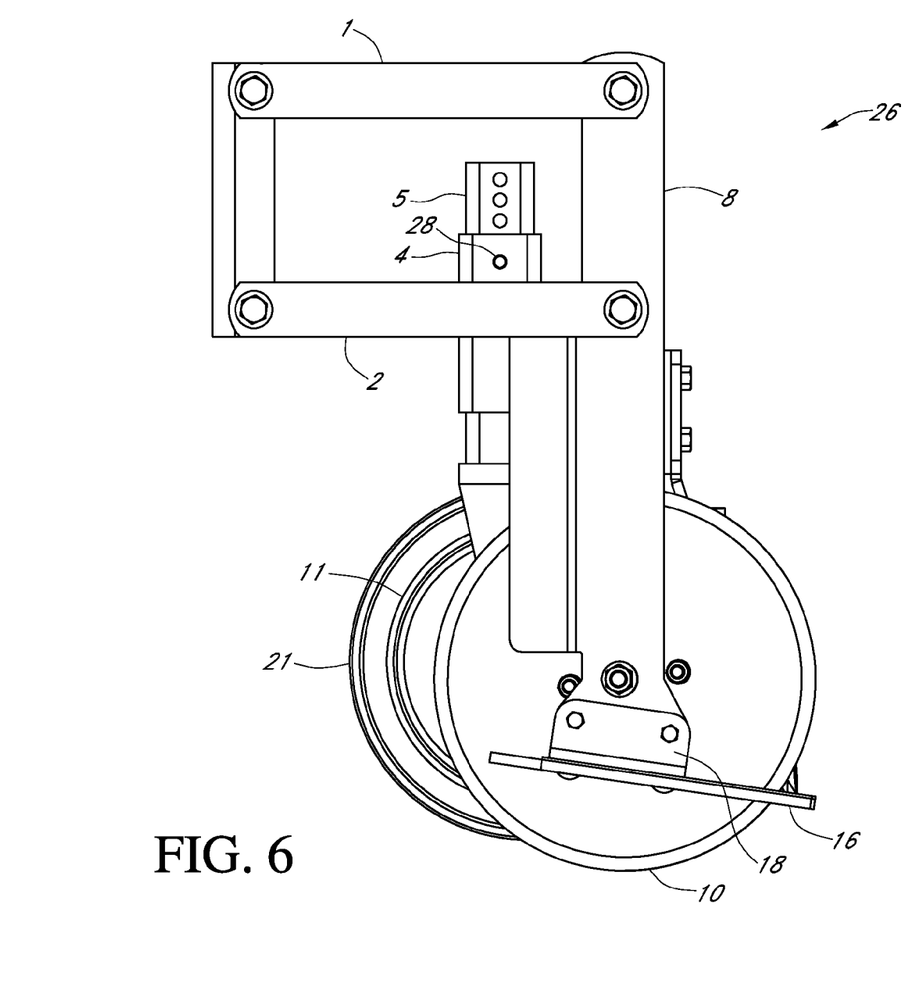
FIG. 6 provides a left side view illustrating embodiment of applicant's opener unit.
Figure 7:
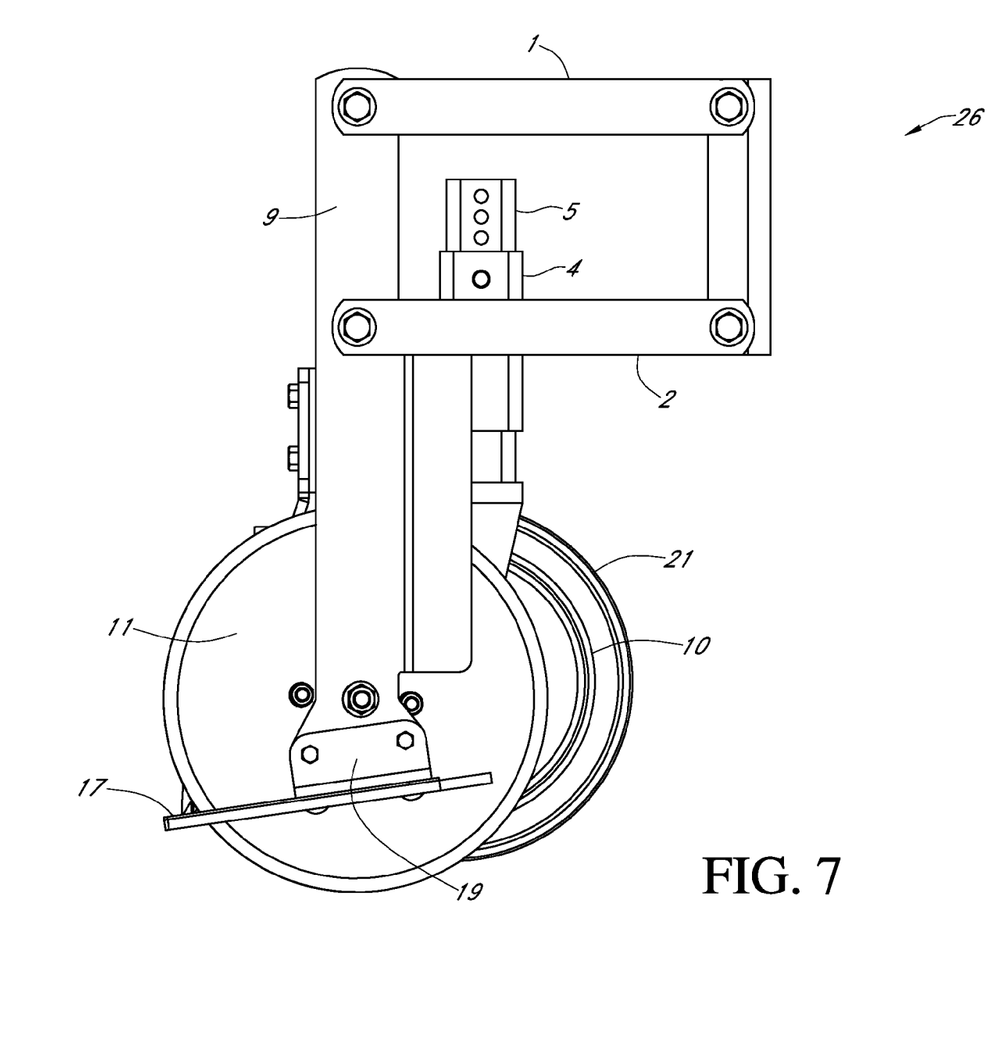
FIG. 7 provides a right side view illustrating embodiment of applicant's opener unit.

Referring now to the drawings, wherein like reference numerals designate identical or corresponding parts throughout the several views, FIG. 1 provides a side perspective of one embodiment of applicant's opener unit 26 for ground surface engagement. Those practiced in the arts will appreciate that the opener unit 26 as disclosed and claimed herein may be adopted for the delivery of fertilizer, pesticide, seed, seed treatments, herbicide and combinations thereof. Although not shown, it will also be appreciated by those practiced in the arts that the opener unit 26 as disclosed is to be mounted on a tool bar or drawbar, similar to a planter row unit as is known in the art, at the row unit mounting plate 3, as partially illustrated in FIGS. 9-12. The row unit mounting plate 3 and j-bolts 38 are one means mounting the opener unit, as recited in the claims. As illustrated in the following figures, the opener unit 26 has a parallel linkage comprised of a pair of upper and lower parallel links (labeled 2 and 3, respectively). The linkage springs (normally present on the parallel linkages have been removed to better illustrate the present art in FIGS. 1-8. FIGS. 9-12 illustrate the present art mounted on a tool bar 31 with linkage springs 32 attached. The pair of parallel linkages is cooperatively secured to the upper portion of the left and right hub supports, 8 and 9, respectively. The pair of spring loaded parallel linkages are one means of supplying down pressure to the opener unit, as recited in the claims. A horizontal support 6 is rigidly affixed to and between the left and right hub supports 8, 9. A left opener disc hub 20 is mounted to the lower end of the left hub support 8. A second (right) opener disc hub 25 is mounted to the lower end of the second (right) hub support 9. A left opener disc 10 is mounted to the left opener disc hub 20 by a left disc axle 29 (see FIGS. 2 and 3). A right opener disc 11 is also mounted to the right opener disc 11 by a right disc axle 30 (FIGS. 2 and 3). See also FIGS. 1, 6 and 7. Hub support 8, 9 are one means of supporting the disc openers 10, 11, as recited in the claims. Disc openers 10, 11 are one means of opener means, as recited in the claims.

Figure 4:
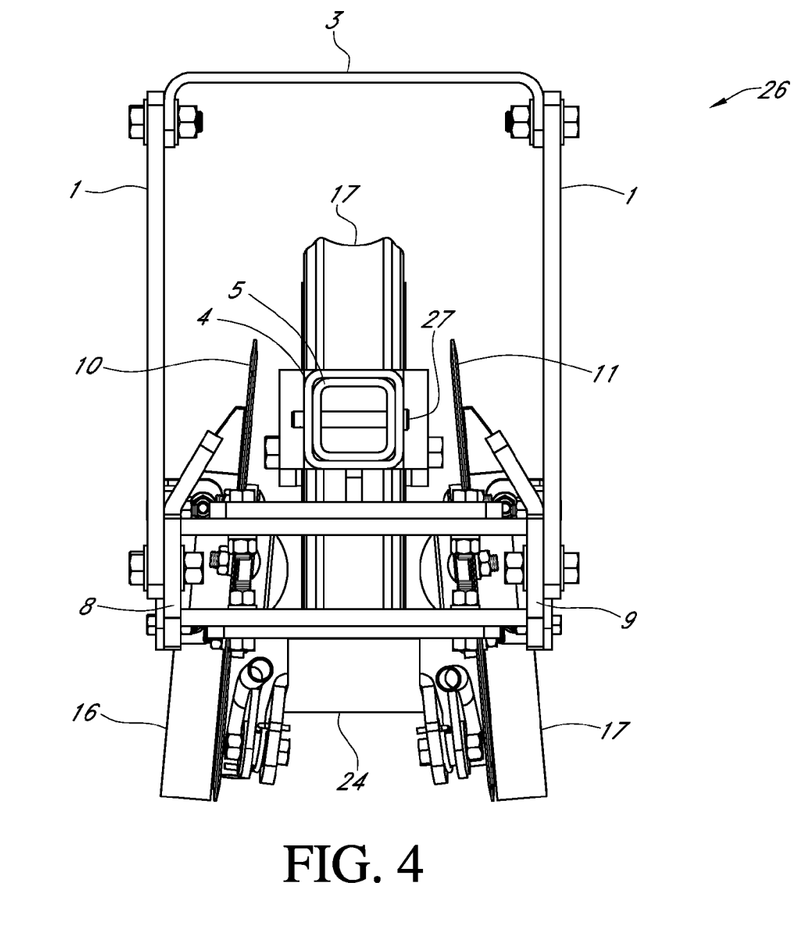
FIG. 4 provides a top view illustrating embodiment of applicant's opener unit.
Figure 5:
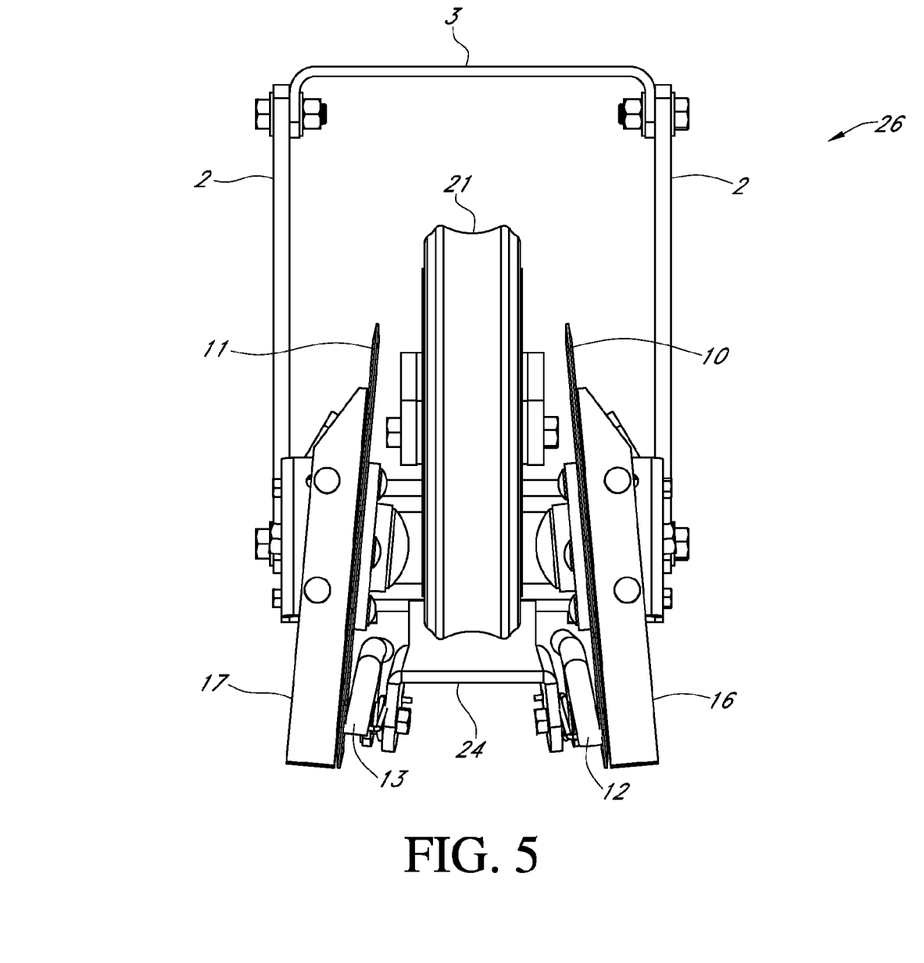
FIG. 5 provides a bottom view illustrating embodiment of applicant's opener unit.

As shown in FIGS. 1-7, depth regulation for the pair of single disc openers is provided by a single gauge wheel 21. As those practiced in the arts will understand, the single gauge wheel 21 shown herein is one means for depth regulation, as recited in the claims. The gauge wheel serves as a depth regulating means having a vertical position relative to said disc openers and responds to forces upon said opener unit 26 to control ground surface engagement. To support the single gauge wheel 21, a receiver tube 4 is vertically orientated and positioned between the left and right hub supports 8, 9. The total vertical depth of the opener unit 26 may be adjusted by the adjustable gauge wheel hub support tube 5. As best shown in FIGS. 3 and 4, vertical adjustment may be made using the pin 27 and support tube pin hole 28 arrangement illustrated. As those of ordinary skill will appreciate, other means of vertical adjustment are contemplated and are within the scope of the present art including actuation using hydraulic cylinders, jacks and springs. The gauge wheel 21 is positioned between the disc openers (10, 11) on an independent axle 23 which is supported by the gauge wheel hub support 22. As best illustrated in FIG. 5, which provides a "bottoms up" view of the opener unit 26, the gauge wheel 21 is positioned slightly forward of the leading edge of the left and right opener discs, 10 and 11, respectively. In minimum and no-till conditions, this configuration and orientation allows the gauge wheel 21 to press and hold against the residue laying on the ground surface as the opener disc(s) (10, 11) initially penetrate or lacerate the residue for improved ground surface engagement while reducing the amount of residue that must cleared or cleaned from the row. The outcome of this orientation is efficacious because the gauge wheel 21 engages the residue straight on while the opener discs (10, 11) slice the residue and the soil at an angle.

The opener unit 26 is also shown with left and right furrow control straps, 16 and 17, mounted to the lower end of the hub supports (8, 9) via furrow control strap mounts 18 and 19. During operation, the furrow control straps (16, 17) cooperatively engage the ground surface to minimize soil disruption as the left and right opener discs (10, 11) engage with the soil of the ground surface to form a furrow. As those practiced in the arts will appreciate, the furrow control straps (16, 17) shown herein are one means of furrow control to minimize soil disruption during furrow creation, as recited in the claims.

As also shown, the left and right opener discs (10, 11) are intersectedly positioned at angles up to five degrees from the direction of travel to counter act side loading and balance the forces placed upon the opener discs (10, 11) during engagement with the ground surface. This configuration and orientation may be implemented with any of the configurations disclosed and claimed herein.

Although the opener unit 26 may be used to simply create furrows, farmers are desirous of using the opener unit 26 to deliver material to furrows. The material delivery means may be a tube or boot that cooperatively engages with the opened furrow. The material delivered may be fertilizer, seed or pesticide or combinations thereof. Those practiced in the arts will appreciate that the foregoing may be simply defined as "soil amendments." As best illustrated in FIG. 3, the left material delivery means is a tube 12 which is cooperatively engaged with the left opener disc 10 to deliver material into the furrow created by the left opener disc 10. The right material delivery means, as shown in FIG. 3, is also a tube 13, which is cooperatively engaged with the right opener disc 11 to deliver material into the furrow created by the right opener disc 11. Although not labeled, the material delivery means may have a biasing means, such as a spring, to ensure engagement with the furrow. The material delivery tube support 24 allows for stable affixation between the hub supports 8 and 9.

Additionally, as illustrated in FIG. 1, the horizontal support 6 allows for affixation of a horizontal center plate 7 having a front and rear face (not labeled). As those skilled in the arts will appreciate, various attachments for improved clearing, closing and cleaning may be affixed to the horizontal support center plate 7 including an auxiliary depth tire, a row cleaner wheel and or a pair of closing wheels, as illustrated, without limitation, in FIGS. 9-12. Applicant holds U.S. Patents on several exemplary models of row cleaning wheels (U.S. Pat. No. 4,785,890) and closing wheels (U.S. Pat. No. 5,497,717) which are incorporated by reference herein.

Figure 8:
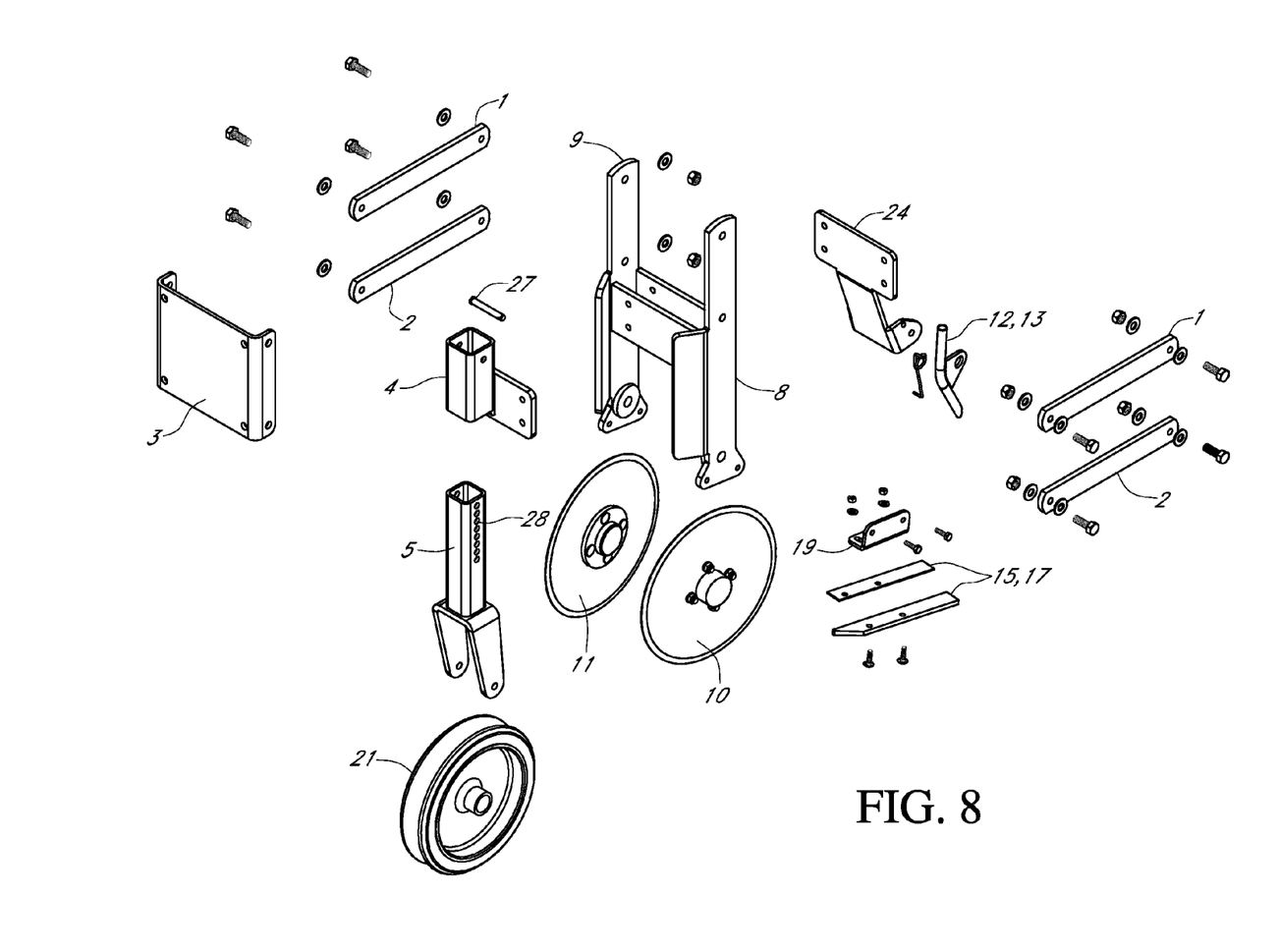
FIG. 8 provides an exploded perspective view illustrating embodiment illustrated in FIGS. 1-7.
Figure 9:
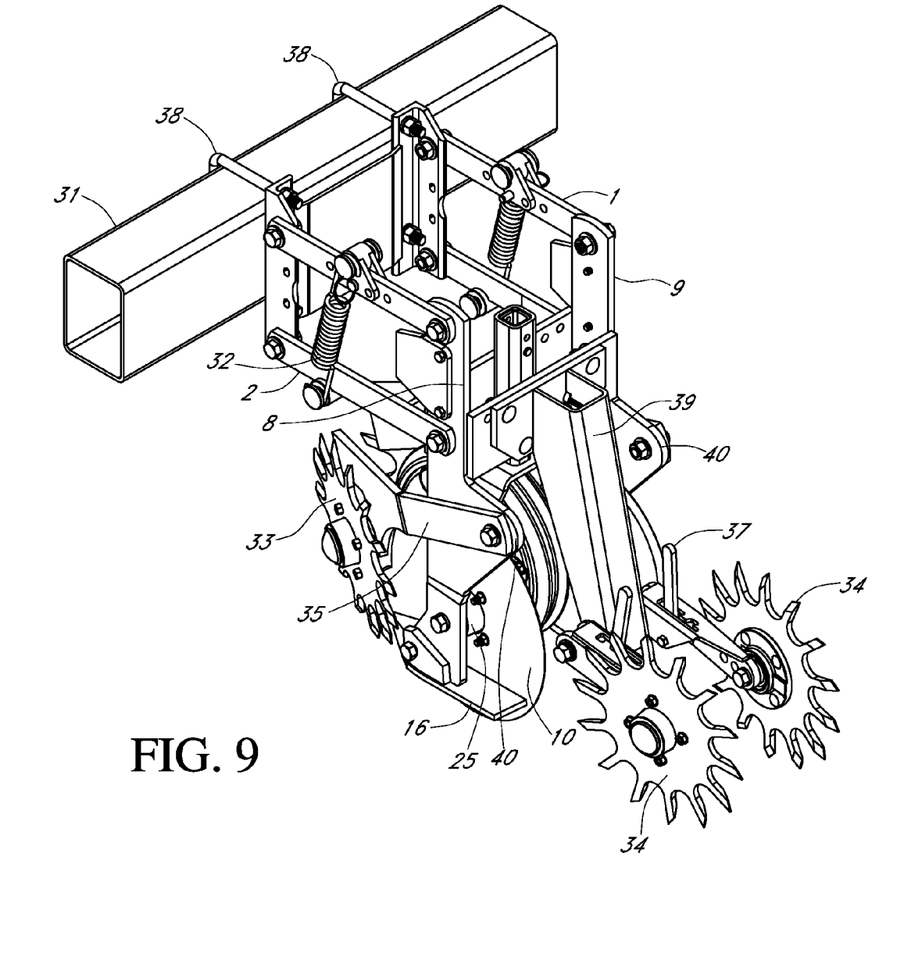
FIG. 9 provides a perspective view illustrating one embodiment of applicant's opener unit with soil amendment attachments.
Figure 10:
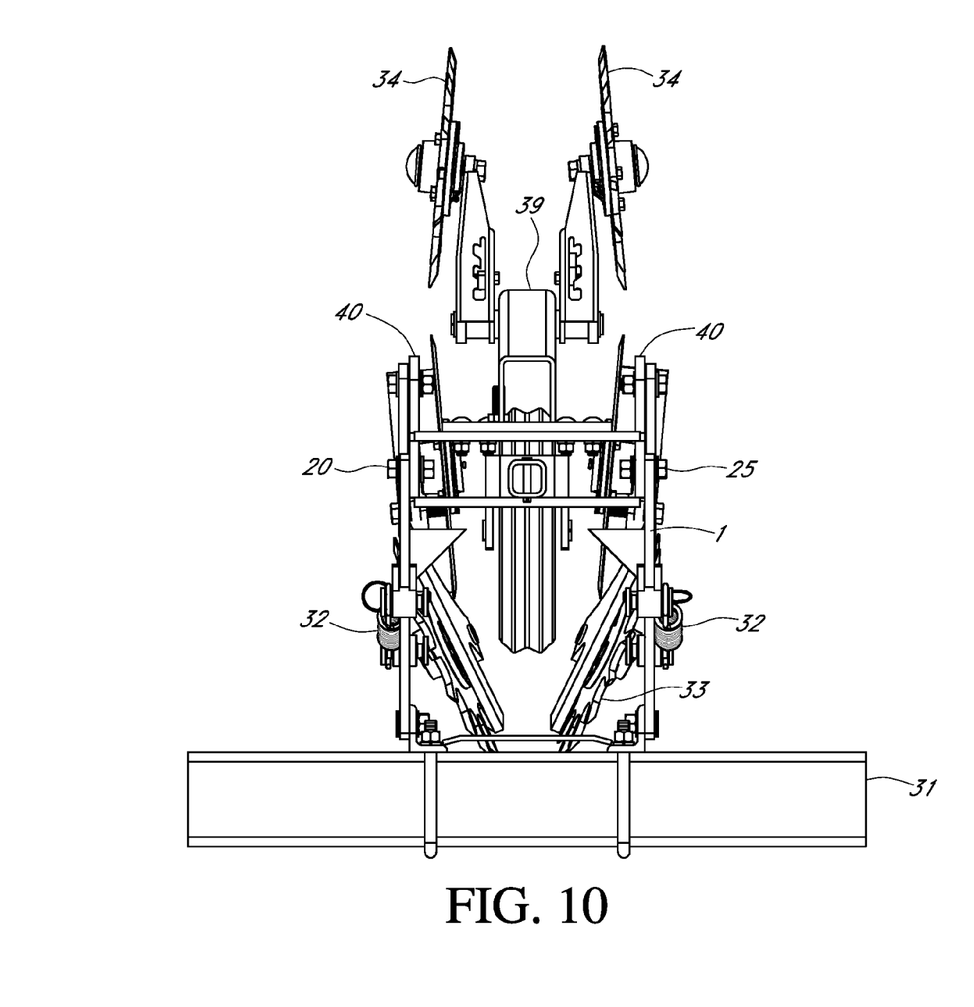
FIG. 10 provides a top view illustrating one embodiment of applicant's opener unit with soil amendment attachments.
Figure 11:
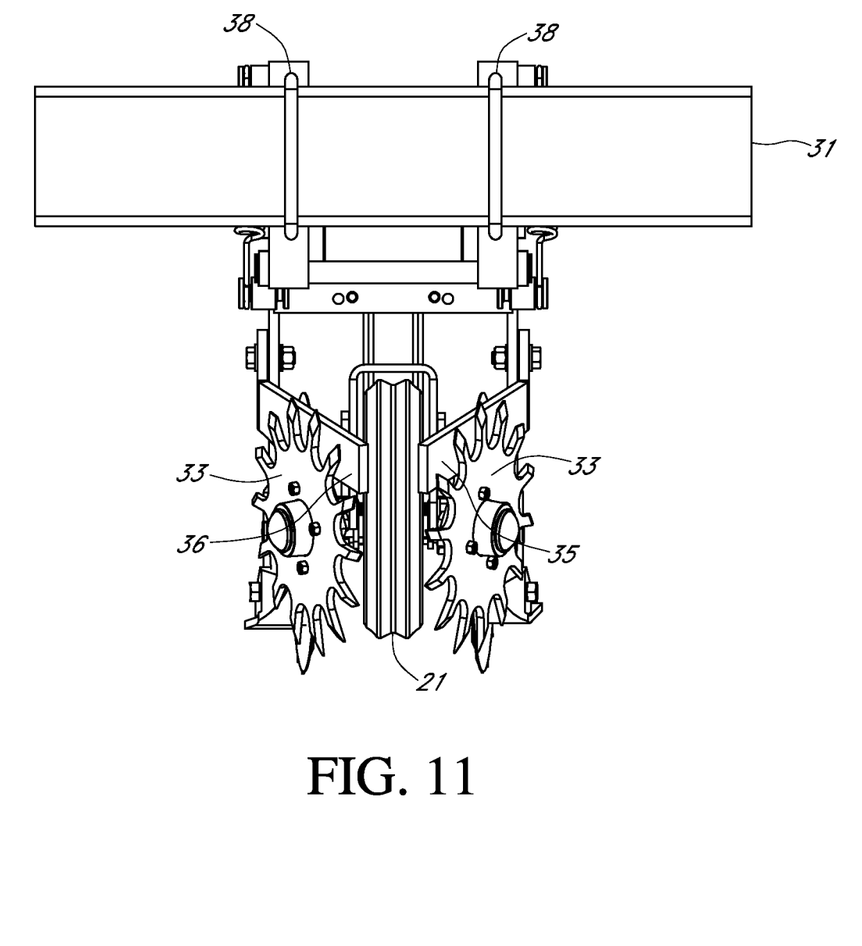
FIG. 11 provides a front view illustrating one embodiment of applicant's opener unit with soil amendment attachments.
Figure 12:
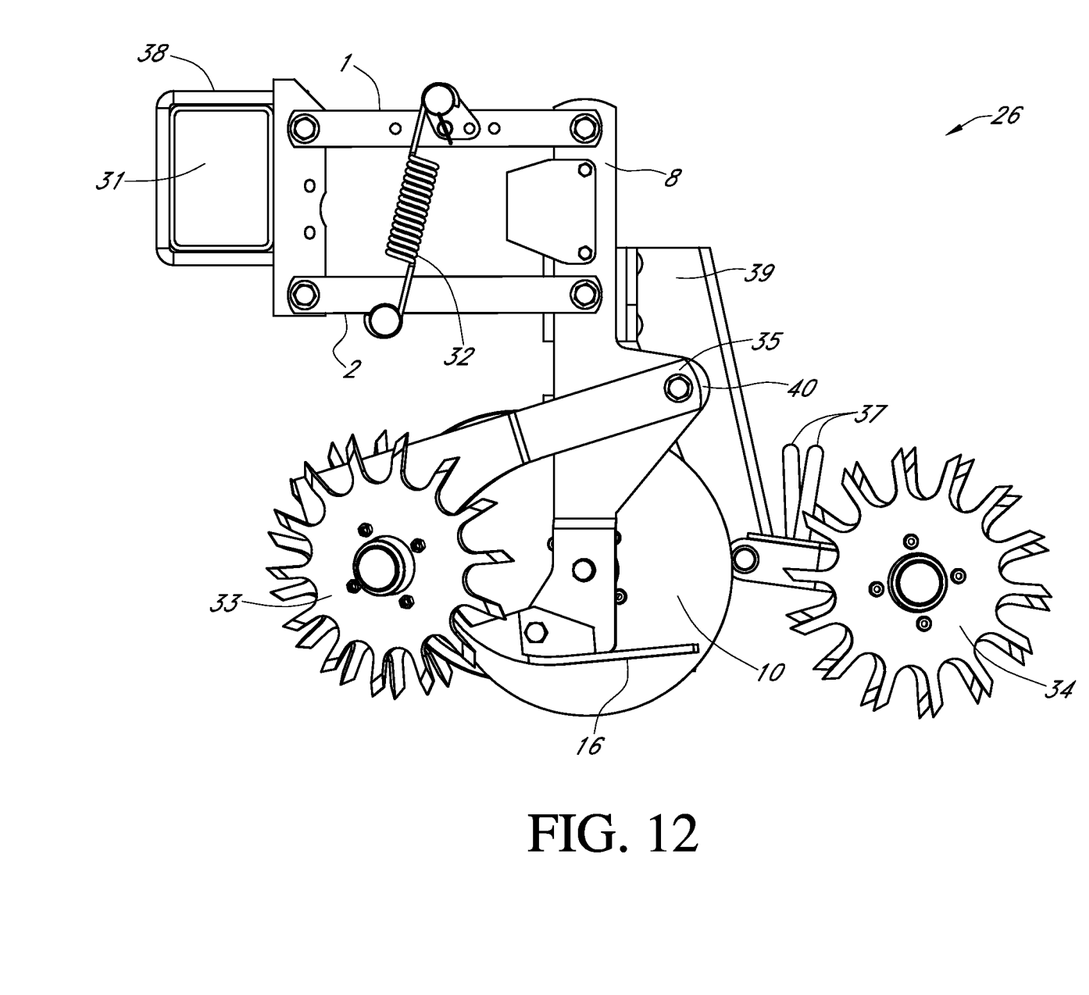
FIG. 12 provides a side view illustrating one embodiment of applicant's opener unit with soil amendment attachments.

FIG. 8 provides an exploded view of the present art. It will be understood by those of ordinary skill in the art that FIG. 8 illustrates one method of fabrication of the present art wherein nuts, bolts and washers are used to fasten or secure the various elements together. As such, it is not necessary to label or call out the various fasteners used in fabrication. High grade steel is typically the preferred material for construction of most of the elements herein although other materials may be chosen as warranted by a particular application. Additionally, other methods of fabrication using combinations of weld assemblies and or cast or molded pieces are within the scope of the disclosure and claims found herein.

FIGS. 9-12 illustrate an embodiment of the present art that is mounted upon a tool bar 31 with row cleaning wheels 33 (front) and closing wheels 34 (rear) attached to the opener unit 26. As illustrated in FIGS. 9-12, front attachment protrusion 40 is positioned at the rear portion of the left and right hub supports 8, 9 and extends rearward from the vertical line formed by the rear end of the parallel linkages and the disc opener hubs (20, 25). The left and right row cleaner arms are then pivotably attached to the front attachment protrusion 40 above the opener discs 10, 11. The row cleaning wheels are then attached to the other end of the row cleaner arms, 35 and 36. This particular configuration of hub support in combination with pivotably attached row cleaner arms provides for a low profile, high clearance row cleaner which may "float" with variation in ground surface. In addition, a pair of single disc openers (10, 11) may work in combination with two row cleaner wheels 33, each mounted on an independent row cleaner arm 35, 36. This combination produces enough clearing of residue from the ground surface to benefit the operation of the disc openers (10, 11) and depth but not so much as to overwhelm the spacing between the pairs of disc openers (10, 11) or adjacent opener units 26. As those practiced in the arts will appreciate, the row cleaning wheels 33 are one means of row cleaning, as recited in the claims. Additionally, closing wheels 34 are one means of closing the furrow created by the opener discs or opener means, as recited in the claims.

Those of ordinary skill in the art will appreciate that this is desirable as it reduces residue plugging during operation and allows relatively narrow spacing between each of the two discs of the opener unit as well as relatively narrow spacing between adjacent opener units. As developed by the Applicant, the present art, when applied to a seeding drill, allows for 7.5 inch spacing between adjacent rows of seeds, which is useful and desired. During operation, the opener unit may be configured for use with row cleaning wheels 33. In this configuration, the first and second row cleaning wheels work independently of each other. This independent operation creates a non-residue covered area of ground surface ahead of each disc opener. As result, a non-residue covered area exists adjacent each side of the depth tire. A benefit of this configuration and operation is that a residue covered area continues to exist after engagement of the depth tire and the opener discs. As result, the ground surface is left with more residue cover which is beneficial and desirable. This occurs because during operation of the opener unit 26 the contact between the depth tire and the ground surface residue during engagement of the opener unit with the ground surface restricts lateral movement of the ground surface residue to maintain residue between the pair of disc openers.

Although not shown, it is within the intent and objectives of the present art for the opener unit to be attached to a tool bar in large number for use as a planter. Furthermore, a plurality of tool bars may be used in combination and positioned in lines, to form a plurality of rows wherein the opener units between the rows of the tool bars are offset to allow narrow row seed spacing.

It should be noted that the present invention is not limited to the specific embodiments pictured and described herein, but is intended to apply to all similar methods for ground surface penetration during operation of planter, seeder or drill unit. Accordingly, modifications and alterations from the described embodiments will occur to those skilled in the art without departure from the spirit and scope of the present invention.

The invention claimed is:

1. A ground engaging apparatus comprising:
   a. a toolbar, wherein said toolbar is adapted to be coupled to a motive source;
   b. a paired single disc opener unit affixed to said toolbar, wherein said paired single disc opener unit comprises:
      i. a set of four-bar parallel linkages, wherein said set of four-bar parallel linkages is pivotable with respect to said toolbar at a first end of said set of four-bar parallel linkages;
      ii. a support frame, wherein said support frame is rotatably coupled with said set of four-bar parallel linkages at a second end of said set of four-bar parallel linkages;
      iii. a left opener disc rotatably coupled to said support frame, wherein said left opener disc is angled with respect to the direction of travel of said ground engaging apparatus so as to form a furrow in the ground surface;
      iv. a right opener disc rotatably coupled to said support frame, wherein said right opener disc is angled with respect to the direction of travel of said ground engaging apparatus so as to form a furrow in the ground surface, wherein said left opener disc and said right opener disc are laterally spaced from one another by a distance sufficient to form adjacent furrows between 5 and 9 inches apart, wherein a line of symmetry exists between said left opener disc and said right opener disc along the direction of travel of said ground engaging apparatus, and wherein the center of said left and right opener discs and said second end of said set of four-bar parallel linkage are coplanar with respect to a vertical plane passing through the center of said left and right opener discs;
   c. a down pressure system coupled to said set of four-bar parallel linkage; wherein said down pressure system is defined as being selected from a group consisting of springs, pneumatic devices, and hydraulic devices;
d. a seed delivery assembly positioned above said support frame;
e. a left opener disc seed delivery tube coupled to said seed delivery assembly;
f. a right opener disc seed delivery tube coupled to said seed delivery assembly;
g. a closing wheel mounting arm mounted to said support frame behind said left opener disc and said right opener disc;
h. a plurality of closing wheels rotatably mounted to said closing wheel mounting arm;
i. a depth regulating member rotatably mounted to said support frame;
j. a right row cleaner arm mounted to said support frame;
k. a first row cleaning wheel rotatably mounted to said right row cleaner arm;
l. a left row cleaner arm mounted to said support frame;
m. a second row cleaning wheel rotatably mounted to said left row cleaner arm.

2. The ground engaging apparatus according to claim 1 wherein adjacent said furrows are 7.5 inches apart.

3. The ground engaging apparatus according to claim 1 wherein adjacent said furrows are 7 inches apart.

4. The ground engaging apparatus according to claim 1 wherein adjacent said furrows are 8 inches apart.

* * * * *